US005349278A

United States Patent [19]
Wedeen

[11] Patent Number: 5,349,278
[45] Date of Patent: Sep. 20, 1994

[54] TORQUE OSCILLATION COMPENSATION UTILIZING VELOCITY FEEDBACK

[75] Inventor: Robert S. Wedeen, Manhattan Beach, Calif.

[73] Assignee: Hughes Aircraft Company, Los Angeles, Calif.

[21] Appl. No.: 61,414

[22] Filed: May 13, 1993

[51] Int. Cl.⁵ .............................................. G05B 5/00
[52] U.S. Cl. .................................... 318/632; 318/629; 318/432; 388/812
[58] Field of Search ............... 318/696, 801, 808, 700, 318/602, 629, 800, 807, 632, 633, 432, 611, 623; 388/820, 809, 819, 812, 815, 930

[56] References Cited
U.S. PATENT DOCUMENTS

| | | | |
|---|---|---|---|
| 4,207,610 | 6/1980 | Gordon | 364/424.04 |
| 4,240,020 | 12/1980 | Okuyama et al. | 318/800 |
| 4,266,176 | 5/1981 | Fulton | 318/801 |
| 4,269,073 | 5/1981 | McIntyre | 318/714 |
| 4,298,831 | 11/1981 | Espelage et al. | 318/808 |
| 4,355,274 | 10/1982 | Baurbeau | 318/805 |
| 4,445,080 | 4/1984 | Curtiss | 318/807 |
| 4,567,409 | 1/1986 | Ogawa | 388/820 |
| 4,661,756 | 4/1987 | Murphy et al. | 318/700 |
| 4,884,016 | 11/1989 | Arello | 318/696 |
| 4,978,894 | 12/1990 | Takehara | 318/811 |
| 5,122,719 | 6/1992 | Bessenyei et al. | 318/602 |
| 5,184,057 | 2/1993 | Sakai et al. | 318/801 |

Primary Examiner—William M. Shoop, Jr.
Assistant Examiner—John W. Cabeca
Attorney, Agent, or Firm—L. A. Alkov; W. K. Denson-Low

[57] ABSTRACT

A torque oscillation compensation system and circuit that uses motor speed to compensate for electrical motor torque pulsations. An input source provides a torque/current command input signal that drives the motor by way of a controller, and a summing device has one input coupled to receive the torque/current command input signal. A controller is coupled to power switching circuitry that is coupled between the power source and the electric motor. A speed sensor is coupled to the motor and is adapted to provide a motor speed output signal. An oscillation compensation circuit is coupled between a speed sensor and the summing device that generates a compensation signal in response to the motor speed output signal that is combined with the torque input signal and compensates for output shaft oscillations. The oscillation compensation circuit comprises an AC coupling capacitor, an amplifier that produces a predetermined phase shift that is designed to provide for the proper amount of compensation and cancel out the torque ripple in the drive signal. The present invention compensates for the torque fluctuations caused by induction motors and permits stable operation thereof. The novelty of the present invention is that compensation is achieved by sensing the AC ripple component of the speed of the output shaft of the motor. This signal is an indication of torque fluctuation and is used to to modulate the motor current and/or motor slip and/or commutating angle and/or the motor field current to eliminate the torque fluctuations of the motor output shaft.

5 Claims, 4 Drawing Sheets

TORQUE OSCILLATION COMPENSATION UTILIZING VELOCITY FEEDBACK

BACKGROUND

The present invention relates generally to torque oscillation compensation for electric vehicle motors, and more particularly, to a torque oscillation compensation system and circuit that uses velocity feedback derived from an electric vehicle motor to compensate for torque pulsations experienced at the output shaft of an electric motor.

Electric drive train systems can exhibit torque pulsations. These torque pulsations can cause motor bearing and tire wear. The torque pulsations can also cause undesirable drive wain/vehicle vibration. Prior art devices for use in stabilizing electric vehicles have attempted to implement vehicle stabilization using gyroscopic compensation. However, gyroscopic techniques have not yet proved to be feasible for use on electric vehicles.

It has been known for some time that induction motors that are driven by variable frequency controllers exhibit torque fluctuations, especially at low speed. Electric vehicles that are propelled by such induction motors therefore exhibit torque fluctuations. This results in unstable operation at low speed and can affect the marketability of the vehicle. Consequently, the prior art approaches are not cost effective and/or technically suited for use in many electric drive train applications.

Accordingly, it is an objective of the present invention to provide for a torque oscillation compensation circuit that uses velocity or speed feedback derived from an electric vehicle motor to generate a compensation signal that compensates for pulsations experienced at the output shaft of an electric motor.

SUMMARY OF THE INVENTION

In order to provide for the above and other objectives, the present invention comprises a torque oscillation compensation system and circuit that uses velocity or speed feedback derived from an electric vehicle motor to generate a compensation signal that compensates for electrical motor pulsations. The novelty of the present invention is that these torque oscillations are compensated for by sensing the AC component of the motor speed signal and coupling a signal having the proper amplitude and phase shift to modulate the motor speed and/or slip and/or current and/or commutating angle and/or field current to eliminate torque fluctuations of the drive shaft.

The torque oscillation compensation circuit of the present invention comprises a shaft encoder coupled to the output shaft of the electric motor which senses speed pulsations that are correlated with torque pulsations. A summing device has one input coupled to receive a current/torque command input signal. An oscillation compensation circuit coupled between the shaft encoder and a second input of the summing device that generates a feedback compensation signal that is combined with the torque input signal that compensates for oscillations present in the output shaft of the electric motor.

More specifically, the present invention comprises a torque oscillation compensation system for use with an electric motor that provides compensation based upon a motor speed. The system comprises an input source for providing a motor phase current amplitude command input signal, such as is derived from an accelerator pedal of an electric vehicle. A summing device has one input coupled to the input source for receiving the motor phase current amplitude command input signal. A power source is coupled to power switching circuitry that drives the motor. A controller is coupled between the output of the summing device and the power switching circuitry. The power switching circuitry is coupled between the controller and the electric motor. A speed sensor is coupled to the electric motor that is adapted to provide an indication of the speed of the drive shaft of the electric motor. An oscillation compensation circuit is coupled between the speed sensor and a second input of the summing device and generates a compensation signal that is combined with the torque command input signal compensates for oscillators present in the output shaft of the electric motor.

The present invention provides compensation for the torque pulsations by utilizing the AC component of a speed signal derived from the motor drive shaft from which compensation signals are derived. This AC-coupled signal is applied to the motor controller by way of the summing device with proper amplitude and phase shift to modulate the motor current and/or slip and/or speed and/or commutating angle and/or field current to eliminate torque fluctuations of the drive train of the vehicle.

The oscillation compensation circuit comprises an AC coupling capacitor serially coupled to the amplifier which has a predetermined transfer function sufficient to compensate for the torque fluctuations. In a specific reduced to practice embodiment of the present invention, a limiter circuit is employed at the output of the compensation circuit, which comprises first and second oppositely coupled diodes.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

By way of introduction, when an electric drive train exhibits a torque oscillation, the rotational velocity increases and decreases about a nominal velocity at the frequency of the torque oscillation. Even systems with high inertia can exhibit a measurable velocity modulation, especially if the modulation frequency is faster than the response time of any speed regulation circuitry in the system, or if the system does not contain any speed regulation. The fluctuations of the motor speed can be sensed and used to modulate or compensate the motor speed and/or slip and/or commutation angle and/or motor current and/or motor field current to eliminate the torque fluctuations of the drive train.

Figures 1, 2:
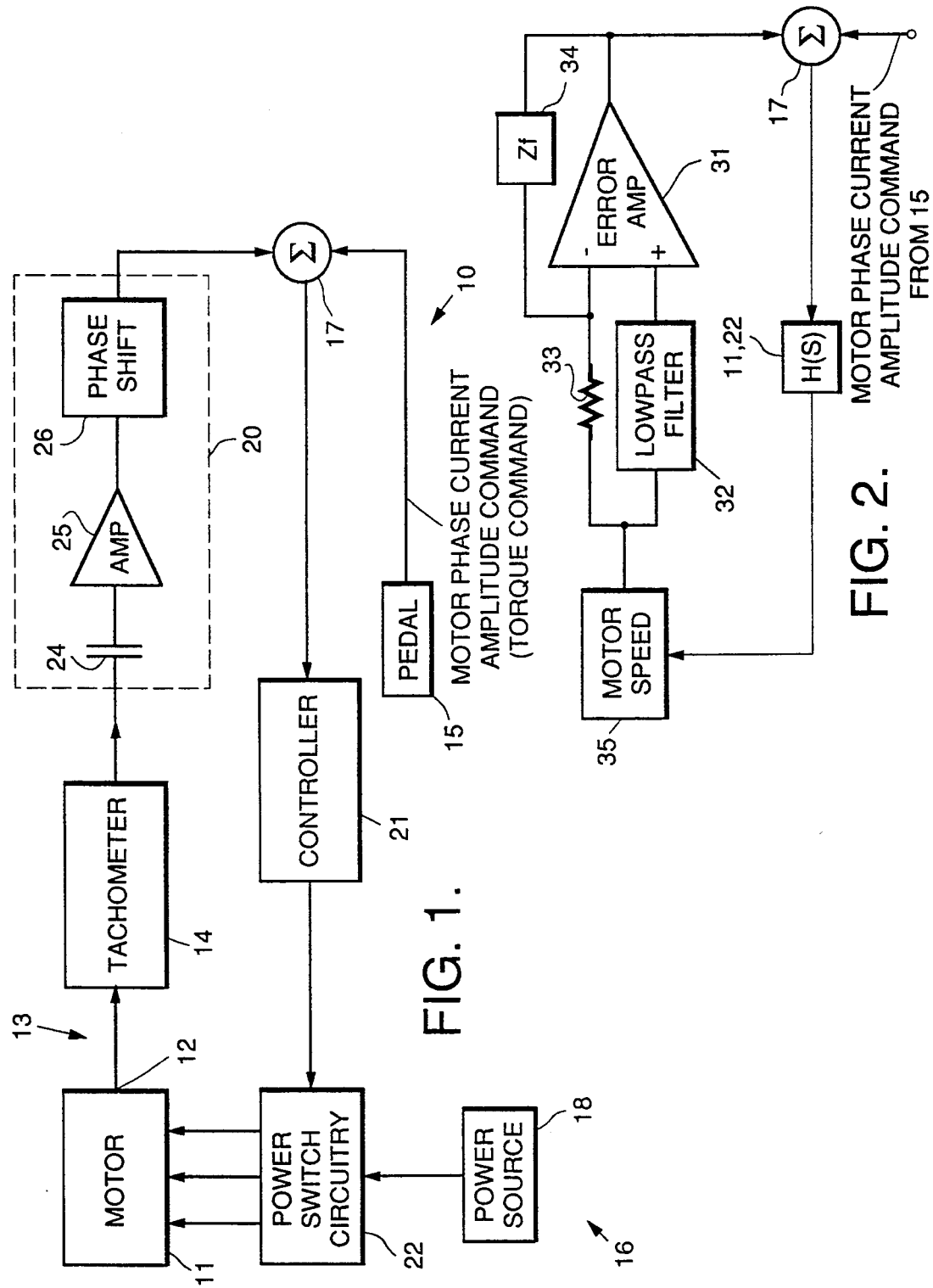
FIG. 1 illustrates a block diagram showing a torque oscillation compensation system in accordance with the principles of the present invention.
FIG. 2 shows a genetic block diagram of the torque oscillation compensation system in accordance with the principles of the present invention.

FIG. 1 illustrates a block diagram showing a specific embodiment of a torque oscillation compensation system 10 in accordance with the principles of the present invention. The torque oscillation compensation system 10 is employed with an electric motor 11 of an electric vehicle 16 and is comprised of a speed sensor 12 or shaft encoder 12 that is coupled to a drive shaft 13 of the motor 11. An output signal from the shaft encoder 12 is coupled to a tachometer 14. The tachometer 14 provides a speed signal at its output. A torque input signal that comprises a motor phase current amplitude command signal, or torque command signal, derived from an accelerator pedal 15 of the vehicle 16 is coupled by way of one input of a summing device 17 that may be part of a controller 21. The controller 21 is coupled by way of power switching circuitry 22 to the motor 11 and applies appropriate signals thereto (typically pulse width modulated drive signals) that cause the motor 11 to accelerate and decelerate and to run in forward and reverse directions.

A vehicle battery 18 or power source 18 is coupled to the power switching circuitry 22. The speed signal derived from the tachometer 14 is coupled to a compensation circuit 20 in accordance with the present invention. The output of the compensation circuit 20 is applied to a second input of the summing device 17 and is summed with the torque command signal derived from the accelerator pedal 15. The output signal from the compensation circuit 20 compensates or modulates the torque command signal in a manner that reduces or eliminates fluctuations experienced at the drive shaft 13 of the motor 11.

The compensation circuit 20 is comprised of an AC coupling capacitor 24, an amplifier 25, and a phase shift device device 26 that implements the AC coupling of the speed signal derived from the tachometer 14. The speed signal derived from the tachometer 14 includes the torque tipple experienced by the drive shaft 13 of the motor 11 and this torque tipple signal is amplified and phase shifted by the compensation circuit 20. The compensation circuit 20 provides a desired torque ripple signal which, when combined with the torque command signals derived from the accelerator pedal 15 in the summing device 17, substantially reduces or eliminates torque fluctuations experienced at the drive shaft 13 of the motor 11. The output of the summing device 17 comprises a compensated torque command signal the is applied to the motor 11 by way of the power switching circuitry 22 and which reduces or eliminates torque fluctuations therein.

Undesirable torque ripple appears as an AC component of the speed signal and is AC coupled by way of the coupling capacitor 24 to the amplifier 25. The amplifier 25 is designed to have the appropriate gain and phase shift (indicated by the phase shift device 26) that develops a signal that eliminates torque pulsations. The compensation circuit 20 output is summed with the torque command signal derived from the accelerator pedal 15 and modulates the motor commands to eliminate the torque pulsations.

The embodiment of the present invention is shown in FIG. 1 was built and tested. An induction motor 11 was operated on a dynamometer with a variable frequency, variable amplitude, 3-phase inverter (comprising the controller 21 ) while the output of a shaft-mounted torque transducer was monitored. Initially, torque oscillations were observed. The motor speed signal was processed by the compensation circuit 20 and summed with the torque command signal, in the manner shown in FIG. 1, which reduced the amplitude of the torque pulsations by an order of magnitude. After some gain and phase adjustments, the torque pulsations were essentially nonexistent.

However, the present invention is not just limited to the embodiment shown in FIG. 1 and more generally may be configured as conceptually shown in FIG. 2. The system 10 depicted in FIG. 2 functions by comparing a desired DC component of the motor speed signal derived from the tachometer 14 with the actual motor speed signal 35, that includes the torque ripple experienced by the motor 11. The desired motor speed signal is derived by filtering out the AC component provided that the frequency of this component is high enough such that the system response time will not be impaired. An error amplifier 31 provides the appropriate gain and phase shift to stabilize the battery current to a DC level and thereby eliminate motor torque fluctuations. A low pass filter 32 produces the DC component of the speed signal which is used as a comparison reference signal by the error amplifier 25 which compares the reference signal to the actual speed (including tipple) that is input through an input resistor 33. The box identified as H(S) is the transfer function through the system 10 and includes the controller 21 and motor 11. The box identified as Z(f) is an impedance 34 that is used to achieve a complex gain for the error amplifier 31 and whose value is dependent upon each particular system 10.

Figure 3A:
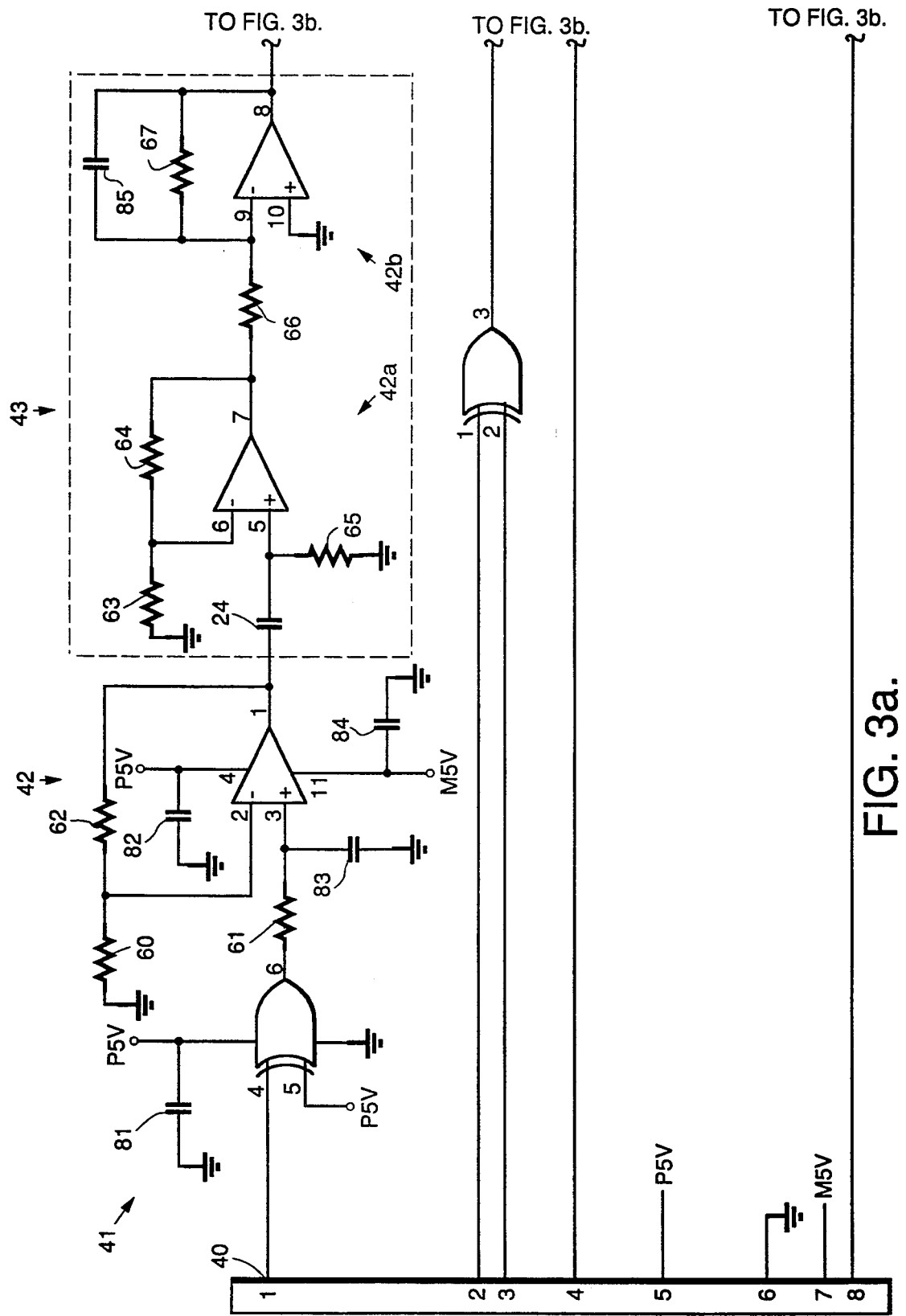
FIGS. 3a, 3b, and 3c show a detailed diagram illustrating an embodiment of the torque oscillation compensation circuit of FIG. 1 that has been reduced to practice.
Figure 3B:
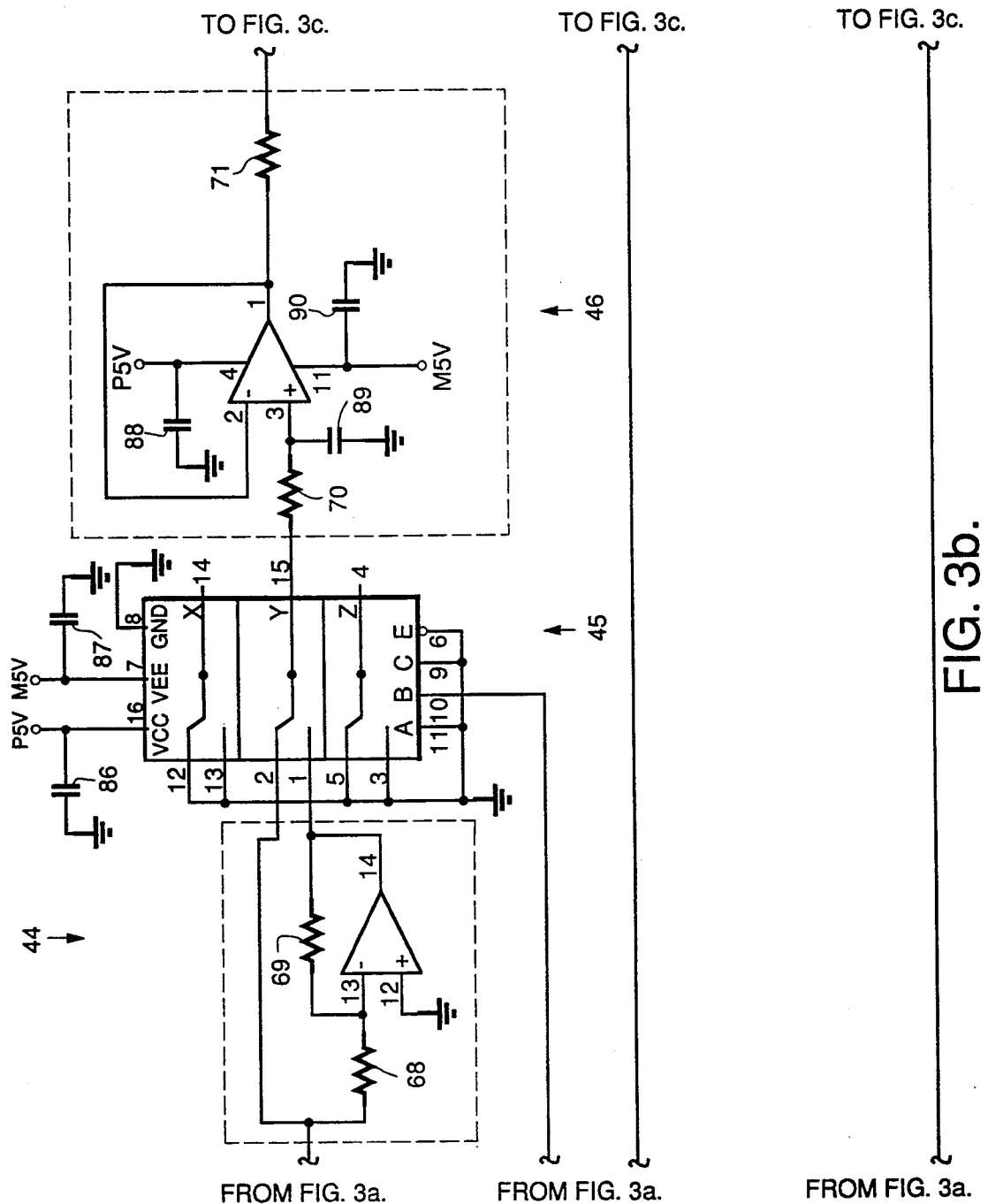
Figure 3C:
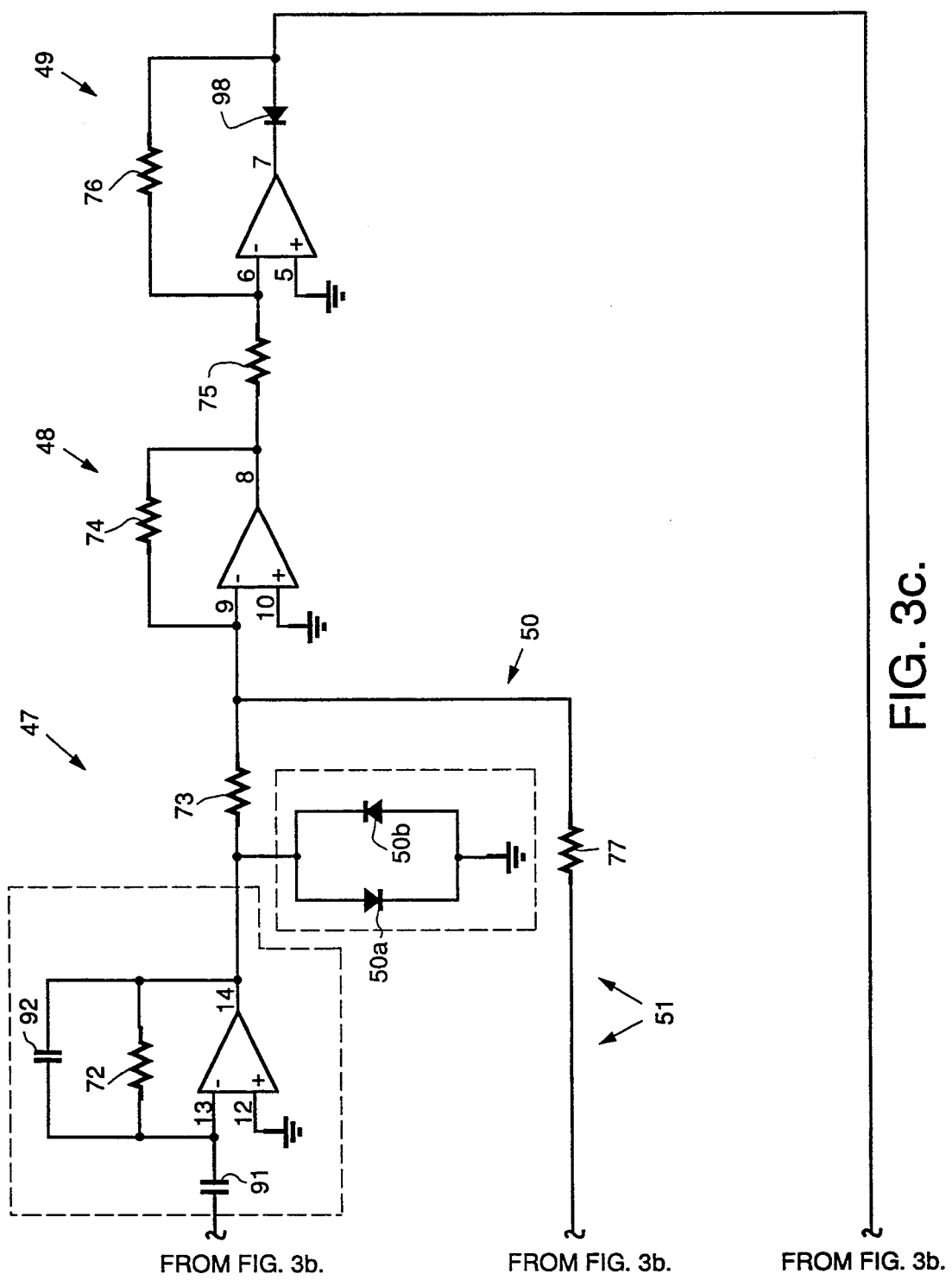

Referring to FIG. 3, which comprises FIGS. 3a, 3b, and 3c, and shows a detailed diagram illustrating an embodiment of compensation circuit 20 employed in the torque oscillation compensation circuit 10 shown in FIG. 1 that has been reduced to practice for use with the vehicle 16. The electrical interconnection of the circuit of FIG. 3 is as shown in the drawing and will not be described in detail. A parts list for the circuit 20 of FIG. 3 is provided hereinbelow for completeness. The compensation circuit 20 comprises a speed input 40 that is coupled by way of an inverter 41 to a first amplifier 42. The first amplifier 42 is coupled to an AC coupled amplifier 43 that includes the AC coupling capacitor 24 at its front end. The AC coupled amplifier 43 is comprised of two serially coupled amplifier circuits 43a, 43b. The output of the AC coupled amplifier 43 is coupled to an inverting amplifier 44. The output of the inverting amplifier 44 is coupled to a multiplexed switch 45 whose output is passed through a low pass filter 46 to a differentiator 47. The low pass filter 46, differentiator 47, form a phase shift circuit 51. The output of the differentiator 47 is coupled by way of a summing amplifier 48 which comprises the the summing device 17 and whose output is coupled through a second inverting amplifier 49. A clamp circuit 50 comprising oppositely coupled dimes 50a, 50b is coupled to the output of the differentiator 47. The output of the second inverting amplifier 49 is the compensated drive signal that is coupled to the controller 21.

For the purpose of completeness, the following is a listing of the values for each of the components shown in FIG. 3: inverter 41=74HC86; amplifiers 42, 43a, 43b 44, 46, 47, 48, 49,=LMC660; multiplexer switch 45=MC4053DM; resistor 60 =1 Kohm; resistor 61=6.8 Kohm; resistor 62=6.8 Kohm; resistor 63=4.7 Kohm; resistor 64=20 Kohm; resistor 65=130 Kohm; resistor 66=1 Kohm; resistor 67=4.7 Kohm; resistor 68=20 Kohm; resistor 69=20 Kohm; resistor 70=300 Kohm; resistor 71=470 ohm; resistor 72=300 Kohm; resistor 73=10 Kohm; resistor 74=10 Kohm; resistor 75=10 Kohm; resistor 76=10 Kohm; resistor 77=10 Kohm; capacitor 24=1 microfarads; capacitor 81=0.1 microfarads; capacitor 82=10 microfarads; capacitor 83=0.068 microfarads; capacitor 84=0.1 microfarads; capacitor 85=1 microfarads; capacitor 86=0.1 microfarads; capacitor 87=0.1 microfarads; capacitor 88=1 microfarads; capacitor 89=1 microfarads; capacitor 90=1 microfarads; capacitor 91=1 microfarads; capacitor 92=2700 picofarads, diodes 50a, 50b=1N4150, and diode 98=MMBD6050L.

When used in a vehicle, the present compensation circuit 20 eliminates torque fluctuations over the entire vehicle speed range in motoring, regeneration and braking modes. The present invention is more effective and less expensive to implement than other methods such as gyroscopic compensation, in-line torque transducer feedback, DC bus voltage modulation, external series/parallel element for the motor 11, and the like. The present invention eliminates the torque instability prevalent in conventional electric vehicles 16, thereby improving vehicle handling. The present invention is more effective and less expensive to implement compared to conventional approaches such as gyroscopic compensation, in-line torque transducer feedback, DC bus voltage modulation, external series/parallel element for motor, and the like.

The present invention is inexpensive, effective, light and extremely feasible for use in electric vehicles '6 as well as other industrial applications, especially those applications that involve the use of an inverter/controller 21 to drive an electric motor 11. Applications of this invention involve stabilizing motors 11 that exhibit torque fluctuations at any speed and may be used in many potential commercial power control systems. Applications of the present invention also include stabilizing drive trains that exhibit torque pulsations, at any speed, in motoring or regeneration and include power control systems, and the like.

Thus there has been described a new and improved torque oscillation compensation system and circuit that uses torque transducer feedback derived from an electric motor. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A torque oscillation compensation system for use with a power source, an electric motor having an output shaft, power switching circuit coupled between the power source and the motor, and a controller coupled to the power switching circuit for controlling the motor by way of the power switching circuit, said system comprising:
   an input source for providing a motor phase current amplitude command input signal for causing the controller to drive the motor;
   a summing device having a first input coupled to the input source for receiving the motor phase current amplitude command input signal and having an output coupled to the controller;
   speed sensing means coupled to the motor for sensing the speed of the output shaft thereof;
   a low pass filter coupled to the speed sensing means for coupling a DC component of the speed signal from the motor that is used as a reference signal;
   an error amplifier having a first input coupled to the low pass filter for receiving the reference signal and having a second input and having an output coupled to a second input of the summing device and wherein the error amplifier generates a compensation signal that is combined with the motor phase current amplitude command input signal that stabilizes the speed of the motor to a DC level and thus compensates for torque oscillations present in the electric motor and thereby eliminate motor torque fluctuations;
   a resistor coupled to the speed sensing means for coupling the speed signal from the motor to the error amplifier; and
   an impedance coupled in a feedback manner between the output of the error amplifier and a selected input of the error amplifier that determines a complex gain for the error amplifier.

2. A torque oscillation compensation system for use with a power source, an electric motor having an output shaft, a controller, and power switching circuitry coupled between the power source and the motor that is controllable by the controller, said system comprising:
   an input source for providing a torque input signal for causing the controller to drive the motor;
   a summing device having an output coupled to the controller and having one input coupled to the input source;
   speed sensing means for sensing the rotational speed of the output shaft of the motor; and
   a torque oscillation compensation circuit coupled between the speed sensing means and a second input of the summing device for generating a compensation signal in response to the rotational speed of the output shaft that is combined with the torque command input signal to compensate for oscillation present in the output shaft of the electric motor.

3. The system of claim 2 wherein the torque oscillation compensation circuit comprises:
   AC coupling means coupled to the error amplifier;
   a second amplifier for providing a predetermined phase shift coupled between the AC coupling means and the second input of the summing device.

4. The system of claim 3 wherein the AC coupling means comprises a coupling capacitor.

5. The system of claim 4 wherein the torque oscillation compensation circuit further comprises:
   a first inverter having an input for receiving the rotational speed signal;
   an AC coupled amplifier having an input coupled to an output of the first inverter;
   an inverting amplifier having an input coupled to an output of the AC coupled amplifier;
   a multiplexed switch coupled to the inverting amplifier;
   a low pass filter having an input coupled to an output of the multiplexed switch;
   a differentiator having an input coupled to an output of the low pass filter;
   a summing amplifier having an input coupled to an output of the differentiator; and
   a second inverter having an input coupled between an output of the summing amplifier and the summing device.

* * * * *